Patented Mar. 1, 1949

2,463,228

UNITED STATES PATENT OFFICE 2,463,228

SILVER SURFACE CATALYSTS AND PROCESS OF PRODUCING SAME

Theo John West, Port Arthur, Tex., and James Pearson West, Chicago, Ill., assignors to Allied Chemical & Dye Corporation, a corporation of New York No Drawing. Application June 11, 1946, Serial No. 676,116

12 Claims. (Cl. 252—228.7)

This invention relates to the production of silver surface catalysts for use in process of making olefin oxides by the direct catalytic oxidation of olefins with oxygen, for example, ethylene to ethylene oxide and to the resultant catalysts.

Among the objects of this invention is to provide a convenient and economical method of producing silver surface catalysts of high activity, selectivity and efficiency, when employed to catalyze the oxidation of olefins to olefin oxides, particularly ethylene to ethylene oxide. Another object is to provide a novel silver surface catalyst of high activity, selectivity and efficiency for catalyzing the oxidation of olefins to olefin oxides, particularly ethylene to ethylene oxide. Other objects and advantages of this invention will be apparent from the following description thereof.

Silver surface catalysts are produced according to the present discovery by co-precipitating silver oxide and a silver halide in the proportions of from .03 to .3 percent silver halide by weight of silver oxide, depositing the co-precipitated silver compounds on a suitable carrier and reducing with ammonia at an elevated temperature.

Silver nitrate, or other silver salts such as silver acetate or silver sulfate, may be treated with any hydroxide, which can be completely removed from the precipitated silver oxide, the hydroxide containing sufficient halide (chloride, bromide, iodide or fluoride) such as the halides of sodium, lithium, potassium, barium, calcium, magnesium, or hydrogen so that silver halide, co-precipitated with the silver oxide, is present in the desired amount. Preferably, silver nitrate is reacted with barium hydroxide containing sodium chloride in amount required to co-precipitate the desired proportion of silver chloride relative to the silver oxide. Instead of barium hydroxide, sodium hydroxide, tetramethyl ammonium hydroxide or ammonium hydroxide may be employed; barium hydroxide and sodium hydroxide are preferred. Irrespective of the reagent used to form the co-precipitate of silver oxide and silver halide, the co-precipitate formed should be washed carefully and for a sufficient period of time to effect removal of impurities, such as residual barium, calcium or magnesium compounds which may be present in the barium hydroxide or other hydroxide employed to react with the silver nitrate or other silver salt. The removal of such impurities can usually be effected by washing the co-precipitated silver oxide and silver halide with water, preferably at a temperature of from 80° to 100° C.

The precipitated silver oxide containing silver halide, together with sufficient water to form a thick slurry is stirred with a carrier until the carrier is well coated. As the carrier, silica, fused alumina refractory materials, and zirconium oxide including but without limitation Tabular Corundum, Alusite and Alundum, crushed and screened to a convenient size, say from 8 to 10 mesh, may be used. Any of the known carriers employed in the production of silver surface catalysts used for catalyzing the olefin to olefin oxide reaction may be used. An alumina refractory type carrier, such as Alundum, is preferred.

The wet catalyst is dried in an oven at about 85° C. and then charged into the catalyst converter employed to carry out the oxidation reaction, and reduced while in the converter before utilization to catalyze the oxidation. The reduction is effected by passing a dilute ammonia gas stream over the catalyst. For example, air containing ammonia is passed over the catalyst for a sufficient period of time to reduce the silver oxide to silver. Instead of air, the ammonia may be diluted with nitrogen or other inert gas. The reducing gas stream may be formed by passing the diluent gas, e. g. air, through an ammonium hydroxide solution, or by adding anhydrous ammonia to the air or other diluent. The amount of ammonia in the gas stream passed over the catalyst may vary within wide limits; from about 1 to about 6 mol percent is preferred.

The temperature of the catalyst during the reduction is preferably maintained within the range of 200° to 280° C. and the reduction carried out under atmospheric pressure conditions, although sub or super atmospheric conditions may be employed if desired.

Water vapor may be added to the ammonia oxygen stream employed to effect the reduction. The larger the concentration of the ammonia in the gas stream employed to effect the reduction, the larger the quantity of water vapor which should be added to this gas stream. Preferably, about 6 mols of water vapor are added per mol ammonia in this gas stream. The reduction may be carried out by introducing into the air stream employed to support the oxidation of the olefin, from about 1 to about 6 mol percent ammonia and 6 mol percent water vapor, passing the resultant mixture over the catalyst at a temperature of about 200° C. for a sufficient period of time to effect the reduction of the silver oxide to silver. The water vapor moderates the reduction reaction and results in a more uniformly activated body of catalyst. The use of water vapor is particularly desirable when activating relatively long catalyst beds maintained in tubes that are relatively large in diameter in which heat transfer from the catalyst to the temperature control medium is not readily accomplished.

While the reason for the increased activity and selectivity of the co-precipitated silver oxide and silver halide catalyst reduced by the ammonia treatment is not positively known, it is believed the silver halide acts as a promoter which causes the catalyst to have improved activity, selectivity and efficiency. During the treatment of the silver halide promoted catalysts with ammonia the silver halide is reduced to silver. At the temperatures involved silver oxide decomposes to produce silver. The silver halide as such may be a poison for the catalyst. However, when the co-precipitated silver halide is reduced to silver by ammonia the resulting silver has a crystal structure more favorable for olefin oxidation than has the silver derived from silver oxide. It is believed that when larger quantities of silver halide are employed than .3 per cent. by weight based on the weight of silver oxide it becomes increasingly difficult to remove the silver halide poison substantially completely and consequently the activity of the catalyst suffers. Although there is good reason to believe the theory set forth above is correct, it is understood this invention is not to be limited by any statements of theory or explanation. In use, the catalyst has been found to be less sensitive to organic sulfur compounds than the unpromoted catalyst and to have increased efficiency, selectivity and activity.

In the examples which follow, the catalyst used was prepared by co-precipitating silver oxide and silver chloride, the amount of silver chloride in each of the catalysts used in the examples being indicated in connection with each example, by treating silver nitrate with barium hydroxide containing sodium chloride in amount to form the desired amount of silver chloride relative to the silver oxide. The co-precipitated silver compounds were deposited on a carrier, the carrier used being indicated in connection with each example, by mixing the carrier particles with the co-precipitated silver compounds and enough water to form a paste. The resultant mixture was dried in an oven at 85° C. and the supported catalyst thus produced charged into a converter where it was reduced by passing thereover an oxygen-nitrogen stream containing 20% by volume of oxygen and 80% nitrogen, to which was added 6 mol percent ammonia and 6 mol percent water vapor. The time of the reduction treatment and the temperature of the catalyst during this treatment for each catalyst used in each example which follows is indicated in connection with each example.

Ethylene, oxygen and nitrogen, in the proportions indicated in each example, were passed over the catalyst at an average temperature, indicated in each example, and a space velocity of 870. Periodically, samples of the reaction products were taken and analyzed to determine their ethylene oxide and carbon dioxide content; from these values the percent attack, percent efficiency and percent conversion given in the tables which follow were calculated. In the tables which follow, the figures under the column heading "Time, Hours" represent the number of hours after the commencement of the run at which the reaction products were sampled and analyzed, as hereinabove described.

By "space velocity" as used herein, is meant the volumes of total gas (at standard conditions of 0.° C. and 760 mm. of mercury pressure) passed over the body of catalyst per hour, per volume of catalyst body. By "percent attack" is meant the mols of ethylene converted to carbon dioxide and ethylene oxide × 100, divided by the mols of ethylene passed over the catalyst. By "percent conversion" is meant percent ethylene converted to ethylene oxide per pass through the converter. By "percent efficiency" is meant the number of mols of ethylene converted to ethylene oxide × 100, divided by the number of mols of ethylene converted to ethylene oxide and carbon dioxide.

EXAMPLE 1

The catalyst used in this example was made by co-precipitating silver oxide containing .17% silver chloride based on the weight of silver oxide. The co-precipitated silver compounds were mixed with Alundum in the proportion of one part silver compound per 8 parts of Alundum, and the resultant supported catalyst reduced by passage over the catalyst at 206° C. an oxygen-nitrogen-ammonia and water-vapor stream in the proportions above indicated for 17½ hours. A mixture containing 20% oxygen, 2.2 to 2.3% ethylene and the rest nitrogen was passed over the reduced catalyst.

Table I

| Run | Average Catalyst T., ° C. | Time, Hours | Percent Attack | Percent Efficiency | Percent Conversion |
|---|---|---|---|---|---|
| 1 | 260 | 13 | 12.8 | 65.4 | 8.4 |
| 2 | 261 | 102 | 93.3 | 55.0 | 51.3 |
| 3 | 262 | 140 | 86.2 | 53.4 | 46.0 |
| 4 | 262 | 178 | 96.8 | 50.2 | 48.6 |
| 5 | 262 | 250 | 95.6 | 54.1 | 51.7 |
| 6 | 262 | 294 | 95.1 | 52.5 | 50.0 |
| 7 | 260 | 341 | 86.0 | 59.3 | 51.0 |
| 8 | 261 | 422 | 93.3 | 47.5 | 44.3 |
| 9 | 261 | 474 | 93.2 | 47.9 | 44.6 |

The catalyst of this example showed a 25% greater percent attack and 3% greater percent efficiency, than a catalyst which differed from the catalyst of the example chiefly in that it did not contain silver chloride.

EXAMPLE 2

The catalyst of this example contained .03% silver chloride based on the weight of the silver oxide co-precipitated with the silver oxide. One part of the silver compounds was deposited on 8 parts of 8 to 10 mesh Alundum, and the supported catalyst reduced by passage of an oxygen-nitrogen-ammonia and water-vapor stream for 15 hours over the catalyst at 200° C.

A mixture of 20 volume percent oxygen, 1.9 to 2.1% ethylene and the rest nitrogen was passed over this catalyst at an average temperature of 259° to 261° C. After 95.75 hours of operation, a percent attack of 80.2, percent efficiency of 67.3 and a percent conversion of 53.9 were obtained.

In the next 289 hours of operation, the attack showed little change (decreased to 78.9%), while the efficiency decreased to 52.6% and the percent conversion to 41.5%.

This catalyst showed a 15% higher yield of ethylene oxide per pass than was obtained with a silver surface catalyst which differed from that of the example, chiefly in that no silver chloride was precipitated along with the silver oxide.

EXAMPLE 3

In this example, one part of silver oxide containing .22% by weight of silver chloride, co-precipitated with the silver oxide, was deposited on eight parts of 8 to 10 mesh Alundum, and the supported catalyst reduced by passage of an ammonia water-vapor oxygen-nitrogen stream thereover, at a temperature of 200° C. for 17.7 hours.

The reactant gas stream containing 20% oxygen from 2 to 2.3% ethylene and the rest nitrogen was passed over a body of this catalyst at an average temperature of 260° to 261° C.

In the first 80 hours of operation, the catalyst showed a rapid increase in the percent attack, steadying-down at 92%; the efficiency reached a maximum of 72% after 40 hours operation, and then decreased gradually, finally steadying-down at 50%, and a maximum percent conversion of 60% was attained after 82 hours operation; after 400 hours operation, the percent conversion had decreased to 45%. After 1534.25 hours of operation, this catalyst gave an attack of 75.1% with 55.5% efficiency and 41.7% conversion of ethylene oxide per pass. Comparative runs made with a catalyst which differed from that of the example, chiefly in that the catalyst was unpromoted, established the catalyst of the above example to be greatly superior in activity, efficiency and selectivity.

EXAMPLE 4

The catalyst used in this example consisted of one part silver oxide containing .11% co-precipitated silver chloride based on the weight of the silver oxide per eight parts of Alundum. The supported catalyst was reduced at a temperature of 200° C. by passage thereover for 17 hours of the ammonia water-vapor oxygen-nitrogen stream in the proportions above indicated.

A gas mixture containing 20% oxygen, between 2.2 and 2.3 percent ethylene, and the rest nitrogen, was passed over the catalyst.

Table II

| Run | Average Catalyst T., °C. | Time, Hours | Percent Attack | Percent Efficiency | Percent Conversion |
|---|---|---|---|---|---|
| 1 | 261 | 6 | 84.8 | 51.2 | 43.4 |
| 2 | 260 | 30 | 77.4 | 50.3 | 38.9 |
| 3 | 260 | 92 | 73.3 | 51.5 | 37.7 |
| 4 | 260 | 114 | 77.0 | 52.0 | 40.0 |
| 5 | 260 | 155 | 79.3 | 49.0 | 38.8 |
| 6 | 260 | 176 | 53.6 | 64.8 | 34.7 |
| 7 | 260 | 277 | 86.9 | 52.2 | 45.4 |
| 8 | 260 | 353 | 87.4 | 49.4 | 43.2 |

Between runs 1 and 2, 37 volumes of amyl mercaptan per million volumes of oxygen, nitrogen and ethylene were introduced into the oxygen-nitrogen-ethylene stream passed over the catalyst, and the flow of this mixture over the catalyst continued for 37 minutes.

Between runs 3 and 4, 6 mol percent ammonia and 6 mol percent water vapor were added to the oxygen-nitrogen stream passed over the catalyst, the flow of ethylene being interrupted. This treatment continued for a period of two hours.

Between runs 5 and 6, .05 mol percent ethylene dichloride was introduced into the ethylene-oxygen-nitrogen stream passed over the catalyst, and the flow of the resultant gas mixture over the catalyst continued for five minutes; thereafter, the flow of ethylene was interrupted and an oxygen-nitrogen stream containing 6 mol percent ammonia and 6 mol percent water vapor passed over the catalyst for two hours.

It will be noted from the above table, the sulfur introduced into contact with the catalyst resulted in a decrease in the percent attack of approximately 10 and had little or no effect on the efficiency of the catalyst. For comparative purposes, a run made with a similar catalyst, not promoted with co-precipitated silver chloride, showed a decrease in the percent attack after a like sulfur treatment of approximately 40 and a decrease in the percent efficiency of 15. From this it is evident that the co-precipitated silver chloride promoted catalysts are much less sensitive to organic sulfur compounds than the unpromoted catalysts.

The data in the above table on runs 4 to 8 inclusive shows that the partially poisoned catalyst may be reactivated by treatment with a halogen compound followed by treatment with oxygen and ammonia in accordance with the process of co-pending application Serial No. 676,114 filed June 11, 1946.

Since certain changes may be made in carrying out the above process without departing from the scope of the invention, it is intended that all matter contained in the above description shall be interpreted as illustrative and not in a limiting sense.

What is claimed is:

1. The process of producing a silver surface catalyst which comprises co-precipitating silver oxide and silver halide in the proportions of from .03 to .3% silver halide by weight of silver oxide and reducing the co-precipitated silver compounds by contact with ammonia.

2. The process of producing a silver surface catalyst which comprises co-precipitating silver oxide and silver chloride in the proportions of from .03 to .3% silver chloride by weight of silver oxide and reducing the co-precipitated silver compounds by contact with ammonia.

3. The process of producing a silver surface catalyst which comprises co-precipitating silver oxide and silver halide in the proportions of from .03 to .3% silver halide by weight of silver oxide, and passing over the co-precipitated silver compounds at a temperature of from 200° to 280° C. a gas stream containing ammonia.

4. The process of producing a silver surface catalyst for catalyzing the oxidation of olefins to olefin oxides which comprises co-precipitating silver oxide and silver halide in the proportions of from .03 to .3% by weight of silver halide, based on the weight of the silver oxide, depositing the co-precipitated silver compounds on a support and reducing the supported silver compounds by passing ammonia over a body thereof.

5. A process as defined in claim 4 in which the reducing gas stream contains 6 mols water vapor per mol of ammonia.

6. The process of producing a silver surface catalyst for catalyzing the oxidation of ethylene to ethylene oxide which comprises co-precipitating silver oxide and silver chloride in the proportions of from .03 to .3% silver chloride based on the weight of the silver oxide, depositing the co-precipitated silver compounds on a support and reducing the thus supported silver compounds by passing a gas stream containing oxygen and ammonia thereover at a temperature of from 200° to 280° C.

7. The process of producing a silver surface catalyst which comprises treating silver nitrate with a hydroxide containing a chloride in amount to co-precipitate silver oxide and .03 to .3% silver chloride based on the weight of the silver oxide, depositing the co-precipitated silver compounds on a carrier and reducing by passing an ammonia-oxygen stream thereover at a temperature of from 200° to 280° C.

8. In the process of producing a silver surface catalyst which comprises treating silver nitrate with barium hydroxide containing sodium chloride in amount to co-precipitate silver oxide containing from .03 to .3% silver chloride by weight of silver oxide, depositing the co-precipitated silver compounds on an alumina refractory support and reducing the supported catalyst by passing ammonia thereover at a temperature of from 200° to 280° C.

9. The process of producing a silver surface catalyst for catalyzing the oxidation of ethylene to ethylene oxide which comprises treating silver nitrate with barium hydroxide containing sodium chloride in amount to co-precipitate silver oxide containing from .03 to .3% silver chloride by weight of silver oxide, adding water to the co-precipitated silver compounds in amount to form a paste, intimately mixing the paste with a refractory alumina support to uniformly deposit the silver compounds on the refractory alumina support, drying the thus supported catalyst and thereafter reducing the dried catalyst by passing an oxygen-nitrogen stream containing from about 1 to about 6 mol percent ammonia and 6 mol percent water vapor thereover at a temperature of from 200° to 280° C.

10. A product for use in producing a catalyst for the oxidation of olefins to olefin oxides, said product consisting essentially of a support, and silver oxide containing from .03 to .3% by weight of co-precipitated silver chloride by weight of silver oxide on said support.

11. A product as defined in claim 10 in which the support is a refractory alumina suport.

12. A product for use in producing a silver surface catalyst, said product consisting essentially of silver oxide containing from .03 to .3% co-precipitated silver halide by weight of silver oxide.

THEO JOHN WEST.
JAMES PEARSON WEST.

REFERENCES CITED

The following references are of record in the file of this patent:

UNITED STATES PATENTS

| Number | Name | Date |
|---|---|---|
| 2,005,645 | Bond et al. | June 18, 1935 |
| 2,085,535 | Langedijk et al. | June 29, 1937 |
| 2,125,333 | Carter | Aug. 2, 1938 |
| 2,142,948 | Law | Jan. 3, 1939 |
| 2,294,383 | Carter | Sept. 1, 1942 |

FOREIGN PATENTS

| Number | Country | Date |
|---|---|---|
| 560,770 | Great Britain | Oct. 13, 1943 |